United States Patent [19]

Worden

[11] 3,711,635

[45] Jan. 16, 1973

[54] MEANS AND METHOD FOR MODIFYING THE FLESH-TONE RESPONSE OF A COLOR TELEVISION RECEIVER

[75] Inventor: Robert F. Worden, Portsmouth, Va.

[73] Assignee: General Electric Company

[22] Filed: Oct. 26, 1970

[21] Appl. No.: 84,068

[52] U.S. Cl. ....... 178/5.4 HE

[51] Int. Cl. ....... H04n 9/12

[58] Field of Search ....... 178/5.4 HE, 5.4 SD, 5.4 R; 329/5

[56] References Cited

UNITED STATES PATENTS

| | | | |
|---|---|---|---|
| 3,525,802 | 8/1970 | Whiteneir | 178/5.4 HE |
| 3,215,770 | 11/1965 | Lynch | 178/5.4 R |
| 3,518,363 | 6/1970 | Funston et al. | 178/5.4 HE |

*Primary Examiner*—Richard Murray
*Attorney*—Frank L. Neuhauser, Oscar B. Waddell, Joseph B. Forman, W. J. Stanley, Stanley C. Corwin and F. W. Powers

[57] ABSTRACT

Sensitivity to aberrations in signals carrying flesh-tone color information is reduced by asymmetrically increasing the chroma signal demodulation angle. A phase shifting circuit is placed in series with each of a pair of synchronous demodulators, and means are provided for simultaneously adjusting the circuits to shift the phase of the chroma signals applied to the demodulators. The chroma signals thus applied are phase-shifted to opposite directions, one being shifted approximately three times as much as the other. The relative amplitudes of the chroma signals outputted by the phase shift circuits to the chroma signals outputted by the phase shift circuits to the chroma signals outputted by the phase circuits to the demodulators are also progressively modified, the difference in relative amplitude increasing as the demodulation angle increases.

10 Claims, 3 Drawing Figures

INVENTOR
ROBERT F. WORDEN
BY James E. Espe
HIS ATTORNEY

INVENTOR.
ROBERT F. WORDEN
BY James E. Espe
HIS ATTORNEY

MEANS AND METHOD FOR MODIFYING THE FLESH-TONE RESPONSE OF A COLOR TELEVISION RECEIVER

BACKGROUND OF THE INVENTION

This invention relates generally to color television receivers and, more particularly, to improved means for rendering flesh tones produced in the image of a color television receiver insensitive to undesired changes or aberrations in signal phase or frequency.

In any given image reproduced by a color television receiver, most of the colors may be considered to be arbitrary in that the viewer has no reference from which he can determine what the original colors in the image were. Other colors, however, are immediately identifiable, the most important of these being flesh tones. Even slight changes in flesh tones are immediately noticeable and produce striking changes in the displayed image. For this reason, it is highly desirable that flesh tones be reproduced with the utmost integrity in the image of a television receiver. Unfortunately, however, the flesh tones represent only a very small portion of the color spectrum as it occurs in the NTSC color triangle, which spectrum may be directly related to the phase of the signals utilized for transmitting color information. Even a very small change in signal phase will cause a significant departure from the generally-recognized flesh tones.

Many attempts have been made to remedy this problem. In one approach, a reference signal is generated within the receiver, and periodically compared to an incoming chroma signal. Undesirable shifts in the incoming signal cause a correction signal to be injected into the system to restore the desired hue to colors in the flesh tone area, sacrificing to a degree the integrity of the colors in those portions of the spectrum adjacent the flesh tone portion. Such a compensating system requires the addition of a number of active elements such as gates and amplifiers, further complicating the receiver circuitry and adding to the cost. Another approach that has been taken is to shift the phase of a reference subcarrier generated from the burst signal, which is applied to synchronous demodulators for deriving color information from the chroma signal. As will be understood by those skilled in the art, the reference subcarrier is normally applied directly to one demodulator and through a phase shifting circuit to the other demodulator. A common chroma signal is fed to both demodulators so that the phase angle between the two reference subcarriers determines the angles at which the chroma signal is demodulated. The included angle, termed the demodulation angle, normally approximates 90° but may depart therefrom in specific instances. Shifting the phase of the reference subcarrier causes the signal applied to the first demodulator and the shifted signal applied to the other demodulator to both rotate in the same sense, while maintaining the original included or demodulation angle. Rotating the phase of the reference subcarrier often serves to compensate somewhat for shifts in the phase of the received chroma signal, but does not serve to render the receiver circuitry substantially less sensitive to fluctuations in the flesh tone signals.

The present invention is an improvement over the invention described and claimed in copending application Ser. No. 83,934 filed concurrently herewith by Theodore V. Zaloudek and assigned to the assignee of the present invention.

SUMMARY OF THE INVENTION

It is therefore an object of the present invention to provide improved means for rendering the image displayed by a color television receiver less sensitive to aberrations in the chroma signal.

It is a further object of the present invention to provide a method for processing signals within a color television receiver to avoid unwanted departures from flesh tones in a displayed image.

Briefly stated, in accordance with one aspect of the present invention, a pair of reactive circuits are provided to receive the chroma signals to be applied to each of a pair of demodulators. One circuit serves to produce a predetermined phase lead in the chroma signal transmitted thereby, the other causing the chroma signal to lag by a desired amount. The phase shift circuits are operated in unison to change the relative phase angle between the chroma signals to be demodulated, and thus the demodulation angle, expanding the angle to cause the receiver to reproduce the desired flesh tones despite changes in the phase or frequency of received signals. Significantly improved maintenance of flesh tones results when the phase of the chroma signals applied to one of the demodulators is rotated by an angle approximately one-third that of the chroma signal applied to the other demodulator. An improved image results from changing the relative amplitude of the phase-shifted chroma signals such that the amplitude of the signal which is caused to lag its original phase is increased in amplitude, while the amplitude of the chroma signal which is shifted to lead its original phase is decreased.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings in which:

DESCRIPTION OF THE PREFERRED EMBODIMENT

Figure 1:
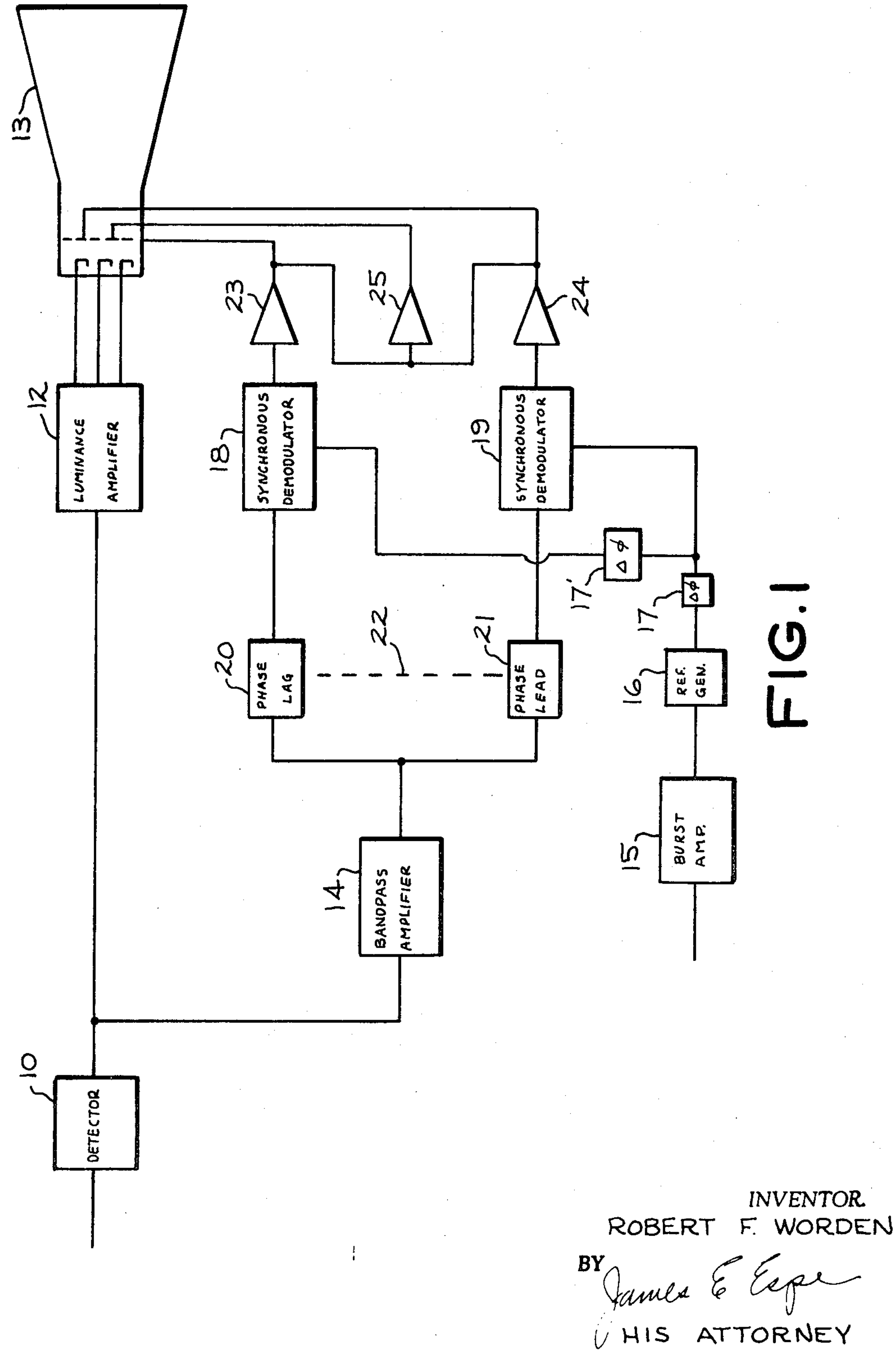
FIG. 1 is a block diagram showing some of the elements of a color television receiver, including means for practicing the present invention.

FIG. 1 shows portions of a typical color television receiver which serve to process signals representing colors of the image being transmitted. A video detector 10 receives signals of a predetermined frequency band from a tuner stage (not shown) and transmits a detected signal to a luminance amplifier 12. The luminance amplifier serves to impress preselected voltages upon the cathodes of three electron guns incorporated within cathode ray tube 13. The detected signal is also applied to a bandpass amplifier 14 which selects a frequency range of 1.0 MHz, passing the sidebands occurring 0.5 above and below the 3.58 MHz subcarrier frequency. A burst amplifier 15 serves to abstract a 3.58 MHz burst signal transmitted at the back porch of the horizontal synchronizing pulse and pass it to a reference generator 16, which typically comprises a circuit having a resonant frequency identical with the subcarrier frequency.

Periodic applications of the 3.58 MHz burst signal to reference generator 16 serves to keep the reference generator oscillating in the proper phase relationship to the transmitted signal. A phase shift circuit 17 receives the subcarrier from the reference generator and shifts the phase thereof by approximately 180°, to cause demodulation to take place in demodulator 19 at the desired phase angle, as will be explained hereinafter. The signal thus obtained is applied to second phase shift circuit 17', which outputs a subcarrier substantially in quadrature with the reference generator output. The shifted and unshifted reference generator outputs are then applied, respectively, to first and second synchronous demodulators 18 and 19.

The chroma signal outputted by bandpass amplifier 14 is applied to first and second phase shift means 20 and 21. Phase shift means 20 imparts a lagging phase relationship to the signal with respect to the phase of the signal as received from bandpass amplifier 14, while means 21 shifts the phase of the signal transmitted thereby such that the phase of the outputted signal leads the phase of the signal received from bandpass amplifier 14. An adjusting mechanism or synchronizing means 22 is provided so that the phase shifting operation of means 20 and 21 may be simultaneously modified, causing the chroma signal outputted by means 20 to lag and the output of means 21 to lead the reference by progressively greater amounts. The outputs of synchronous demodulators 18 and 19 are applied to color difference amplifiers 23 and 24, and the differential output thereof applied to a third color difference amplifier 25. The outputs of the three color difference amplifiers are then transmitted to the proper grids of cathode ray tube 13 for modulating the outputs of the three electron guns therein.

Figure 2:
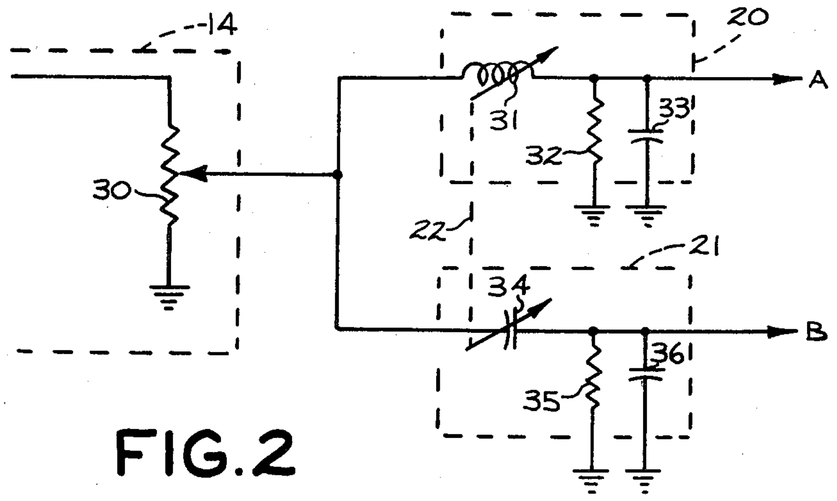
FIG. 2 is a schematic diagram of a pair of phase-shifting circuits suitable for use in practicing the present invention.

Referring now to FIG. 2, circuits are shown which represent one embodiment of phase lag 20 and phase lead means 21. The output stage of bandpass amplifier 14 is represented as comprising a potentiometer for providing chroma gain control in a manner well known to those familiar with the color television receiver art. Phase lag means 20 comprises an inductor 31 lying in series with the chroma signal path and a resistor 32 in shunt therewith, forming an integrating circuit for imparting a lagging phase relationship to the chroma signal. A differentiating circuit comprising capacitor 34 placed in series with the signal flow path, and resistor 35 in shunt therewith, constitutes the circuit of phase lead means 21 for imparting a leading phase relationship to the signal exiting therefrom. Capacitors 33 and 36 may be connected in shunt with resistors 32 and 35 of phase shifting means 20 and 21 respectively for modifying the amplitudes of the signals transmitted thereby and further improving the operation of the present invention, as will be explained hereinafter. In the present embodiment, inductor 31 and capacitor 34 are designated as being adjustable, and linked by synchronizing means 22 such that increasing phase lag is imparted to signal A while increasing phase lead is simultaneously imparted to signal B.

Figure 3:
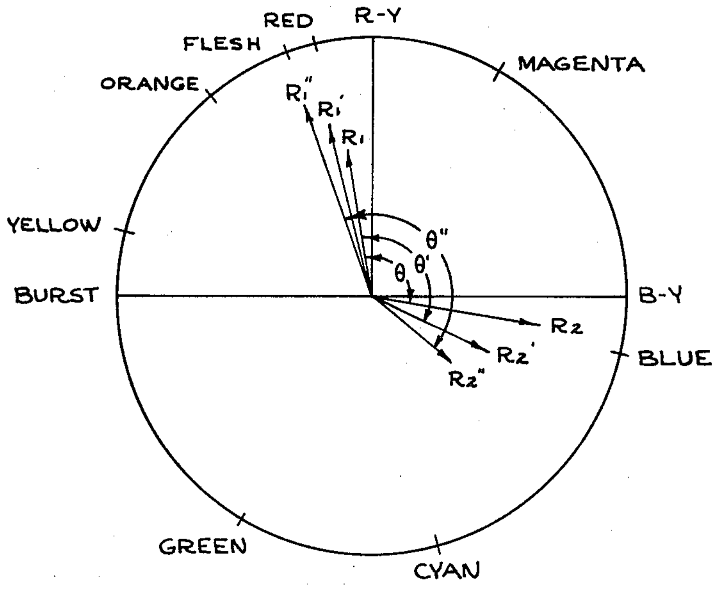
FIG. 3 is a phasor diagram showing the relative phase position of the subcarrier reference signals with respect to the chroma signals.

FIG. 3 shows the phase relationship to the subcarrier signals with respect to the chroma signals which they are used to demodulate. Phasor $R_2$ is positioned at the angle at which the unshifted subcarrier derived from first reference phase shift means 17 demodulates the chroma signal received from phase lead means 21. Similarly, phasor $R_1$ is disposed at the relative phase angle at which the chroma signal received from phase shift means 20 is demodulated by the reference subcarrier as shifted by second reference phase shift means 17' and applied to demodulator 18. It will be recognized by those skilled in the art that the initial angle between phasors $R_1$ and $R_2$, known as the demodulation angle, is arbitrary and is selected to produce optimum results for a given receiver operating under normal conditions. In the disclosed embodiment an initial demodulation angle of 110° has been utilized, with the $R_2$ phasor leading the reference phasor by 10° and the $R_1$ phasor lagging the reference by 100°. Other initial phase relationships may be selected, it being understood that the initial positions of the $R_1$ and $R_2$ phasor comprise no part of the present invention.

While it is possible to apply a reference subcarrier having a single phase to the synchronous demodulators, and shift the chroma signals such that the chroma signal is demodulated at different phase angles in the demodulators, the present embodiment is regarded as that most suitable for use in home television receivers.

In practicing the invention, an initial demodulation angle $\theta$ is determined by means of reference subcarrier phase shift circuits 17 and 17'. By utilizing circuits 17 and 17' for providing the major, initial phase difference between the signal components to be demodulated, the elements selected for phase shift circuits 20 and 21 are more easily adapted to their present use. Further, as explained in copending application Ser. No. 83,934, should the subcarrier phase shift circuits be utilized for adjustably changing the detection angle the adjustable portion thereof would have to be placed in a position in the receiver cabinet readily accessible to an operator. Serious problems in the design of other components would then be experienced, particularly with respect to interference and radiation from the reference subcarrier conductor which would have to extend to the control area of the receiver and back to the demodulators. On the other hand, the output of the bandpass amplifier must be delivered to the control area of the receiver for color saturation adjustment. For this reason, it is desirable that the adjustable phase shift be provided in the chroma signal path. While this approach is taught in the above-mentioned copending application, and provides means for rendering a color television picture signal relatively insensitive to signal phase shifts which seriously affect the accurate reproduction of flesh tones in a displayed image, it is within the scope of the present invention to enhance the action of the apparatus by utilizing phase lag and phase lead circuits which induce unequal phase shifts in the chroma signals applied to the demodulator means of the receiver such that the demodulation angle is increased asymmetrically.

More particularly, by causing the $R_1$ phasor to lag the reference subcarrier applied to demodulator 18 by an additional amount which is smaller than that additional amount by which the $R_2$ phasor leads the reference applied to demodulator 19, aberrations in flesh-tone signals are greatly minimized. Since the positions of phasors $R_1$ and $R_2$ each represent the relative phase angle between the chroma signal applied to a given demodulator and the subcarrier applied to the same demodulator, it will be understood by those skilled in the art that the leading displacement of $R_1$ with respect to the chroma signal may be accomplished either by inducing a phase lead in the subcarrier applied to demodulator 20 or, equivalently, by inducing a phase lag in the chroma signal applied thereto. Similarly, the lagging displacement of phasor $R_2$ may be accomplished by causing the reference subcarrier applied to demodulator 21 to lag its original phase, or by inducing a phase lead in the chroma signal. As set forth above, it presently appears that the more practicable approach is the one depicted, i.e., to progressively shift the phase of the chroma signals applied to the demodulators. The desired inequality between the phase shifts may be attained by the selection of a suitable adjusting mechanism for the reactive elements 31 and 34.

While the foregoing approach serves to improve the reproducibility of flesh tones, still further improvement occurs when certain changes in the amplitude of the chroma signals outputted by phase shift circuits 21 and 22 accompany shifts in the phase thereof. In particular, it has been found that by incorporating shunt capacitance shown at 33 into phase shifting means 20, the amplitude of the chroma signal will increase along with phase lag as the value of the inductance increases. Similarly, by incorporating shunt capacitances shown at 36 into means 21, the amplitude of the signal transmitted to synchronous demodulator 19 is caused to decrease as the phase lead is increased.

The increase in amplitude of the chroma signals transmitted by phase shift means 20 is apparently due to a resonance occurring between inductor 31 and capacitor 33, while the decrease in the amplitude of chroma signals transmitted by phase shift means 21 is thought to be due to the decreased impedance owing to the shunting action of capacitor 36. The capacitance afforded by capacitors 33 and 36 may advantageously be provided for through judicious design utilizing the distributed capacitance occurring between the output leads of the phase shift means and the ground plane, allowing the deletion of the discrete capacitors and the resulting economy of construction.

While no precise relationship between the values of amplitude-modifying capacitances 33, 36 and the related phase shifting means has been established, a capacitive value of approximately 31 picofarads for each of capacitors 33, 36 has been found to produce satisfactory results when utilized in conjunction with phase lag and lead circuits using a series inductance having a maximum value of 5.4 microhenrys, and a series capacitor having a minimum value of 43 picofarads, respectively. Shunt resistances having a value of 910 ohms may be used for the resistors 32 and 35.

It will be seen that the chroma signal to which phase lag is imparted is demodulated in the red-orange part of the color spectrum in a manner analogous to R—Y detection. The chroma signal applied to synchronous demodulator 19 is demodulated in the blue-cyan part of the spectrum in the manner of B—Y detection. Since, as the demodulation angle changes, the R—Y and B—Y signals are, strictly speaking, no longer demodulated, it is more proper to consider the output of synchronous demodulator 18 as representing a phasor in the red-orange portion of the spectrum and the output of synchronous demodulator 19 representing a phasor orientated in the blue-cyan portion of the color spectrum. It will be noted in FIG. 3 that as the demodulation angle between phasors $R_1$ and $R_2$ is progressively increased from $\theta$ to $\theta'$, and to $\theta''$, corresponding to phasors $R_1$, $R_1'$ and $R_1''$, and $R_2$, $R_2'$ and $R_2''$ respectively, the magnitude of the red-orange phasor $R_1$ is caused to increase substantially while the magnitude of blue-cyan phasor $R_2$ is decreased. The increased demodulation angle and the change in relative amplitudes of the phasors tend to suppress those colors lying in those portions of the spectrum corresponding to the central areas of the major and minor arcs defined by the demodulation angle, emphasizing those colors which lie about the $R_1$ phasor. Flesh tones, being in the general vicinity of the $R_1$ phasor, are not substantially affected and minor excursions in the phase of the chroma signals conveying flesh tone information are rendered substantially unnoticeable.

While it is possible to rotate the $R_1$ and $R_2$ phasors until they become colinear, and modify the relative amplitudes until the magnitude of the $R_2$ phasor is negligible with respect to the $R_1$ phasor, it has been found that the maximum detection angle usable in practicing the present invention is approximately 150°. At this detection angle, most of the excursions in phase of the chroma signal which are to be encountered in normal reception are suppressed or compensated for at the expense of some loss in the integrity of colors in the other portions of the color spectrum. Similarly, by reducing the detection angle to a minimum, here shown as 110°, the image produced by the receiver becomes more susceptible to noticeable changes in flesh tone caused by aberrant signals but provides increased integrity in the reproduction of colors in other portions of the spectrum. Superior results are obtained in emphasizing the fleshtone portion of the spectrum if the phasor detected in the red-orange portion of the spectrum is shifted by an increment which is significantly less than the shift imparted to the phasor detected in the blue-cyan portion of the spectrum. Referring to FIG. 3, it will be seen that the increments of phase displacement of the $R_1$ phasor induced by phase lag circuit 20 are less than the increments of phase displacement of the $R_2$ vector caused by phase lead circuit 21. In particular, it has been found desirable to shift the blue-cyan phasor, hereinafter referred to as the $R_2$ phasor, approximately three times as much as the red-orange phasor, hereinafter referred to as the $R_1$ phasor. While this relationship need not be exact, a phase lag-to-phase lead ratio of substantially 3:1 serves to adequately maintain the integrity of the received image, while enhancing the reproduction of flesh tones from aberrant signals.

This action is further enhanced by an increase in amplitude of the lagging chroma signal which is to be demodulated to form a red-orange signal, herein represented by the length of the $R_1$ phasor, with a corresponding decrease in amplitude of the leading chroma signal which will be demodulated to form a blue-cyan signal, represented by the length of the $R_2$ phasor. It has been determined, for instance, that an increase in amplitude of approximately 12 per cent accompanied by a 5° phase lag in the $R_1$ phasor, and a 25 per cent reduction in amplitude accompanied by a 15° phase lead imparted to the $R_2$ phasor, faciliates the production of a good quality image by the receiver. Some latitude is available with respect to the enumerated values; for instance, a variance of ± 3° by the $R_1$ and ± 15° by the $R_2$ phasor still provides acceptable flesh tone control. Similarly, a phase lag of 10° accompanied by a 25 per cent increase in amplitude of the $R_1$ vector, and a 30° phase lead accompanied by a 50 per cent reduction in amplitude of the $R_2$ vector, serves to maintain an aesthetically pleasing color relationship in the image produced by the receiver while further accentuating signals near the flesh tone area and suppressing other colors. Again, some latitude in the enumerated values is available. It would thus appear that, for the range of values indicated, an increase of approximately 2.5 per cent in amplitude per degree phase lag of a phasor in the red portion of the color spectrum, accompanied by a decrease of approximately 1.66 per cent in amplitude per degree of phase lead imparted to the phasor in the blue portion of the color spectrum, provides an aesthetically acceptable color television image while maintaining or increasing the reproducibility of flesh tones.

As will be evident from the foregoing description, certain aspects of the invention are not limited to the particular details of construction of the examples illustrated, and it is therefore contemplated that other modifications or applications will occur to those skilled in the art. It is therefore intended that the appended claims shall cover such modifications and applications as do not depart from the true spirit and scope of the invention.

What is claimed as new and desired to be secured by Letters Patent of the U.S. is:

1. In a color television receiver including means for deriving a chroma signal and first and second demodulator means, the method of rendering the flesh tones of an image being displayed by said receiver less sensitive to aberrations in said chroma signal comprising the steps of:

inducing a phase lag in said chroma signal to create a lagging phase-shifted signal;

applying said lagging phase-shifted signal to said first demodulator means;

inducing a phase lead in said chroma signal to create a leading phase-shifted signal; and applying said leading phase-shifted signal to said second demodulator means;

said phase lead being larger than said phase lag.

2. The method as defined in claim 1, wherein said phase lead is substantially three times as large as said phase lag.

3. The method as defined in claim 2, further including the steps of:

increasing the amplitude of the chroma signals applied to said first demodulator means as said phase lag is increased; and decreasing the amplitude of the chroma signals applied to said second demodulator means as said phase lead is increased.

4. The method as defined in claim 3 wherein the amplitude of the chroma signal applied to said first demodulator means is increased by substantially 2.5 per cent per degree of phase lag, and the amplitude of the chroma signal applied to said second demodulator means is decreased by substantially 1.7 per cent per degree of phase lead.

5. In a color television receiver including first and second demodulator means, means for producing a reference signal and means for deriving a chroma signal, said chroma signal having a predetermined phase relationship to said reference signal, means for rendering flesh tone portions of images displayed by said television receiver less sensitive to aberrations in said chroma signal comprising:

first phase shifting means to receive said chroma signal and to cause the phase of said chroma signal to lag the received chroma signal by a first angle, said first phase shifting means applying the phase shifted chroma signal to said first demodulator means;

second phase shifting means to receive said chroma signal and to cause the phase of said chroma signal to lead the received chroma signal by a second angle, said second phase shifting means applying the phase-shifted chroma signal to said second demodulator means, said second angle being larger than said first angle.

6. The invention defined in claim 5, wherein said second angle is substantially three times as large as said first angle.

7. The invention defined in claim 6, further including:

means for simultaneously operating said first and said second phase shifting means to cause first angle and second angle to vary, the relative size of said angles being maintained in the ratio of one to three.

8. The invention defined in claim 7, further including means for increasing the amplitude of the phase-shifted chroma signal applied to said first demodulator means, and means for decreasing the amplitude of the phase-shifted chroma signal applied by second phase shifting means to said second demodulator means as said first and said second angles are increased.

9. The invention defined in claim 8, wherein the amplitude of said chroma signal applied to said first demodulator means increases substantially 2.5 per cent for each additional degree of phase lag, and the amplitude of said chroma signal applied to said second demodulator means decreases by substantially 1.7 per cent for each additional degree of phase lead.

10. The invention defined in claim 9, wherein said first phase-shifting means is operable to cause said chroma signal to be demodulated at an angle which leads said reference signal by substantially 100°, 105°, or 110°, said amplitude increasing means being operable to increase the amplitude of said chroma signal applied to said first demodulator means in the ratio of 1, 1.12, or 1.23 respectively, and said second phase shifting means is simultaneously operable to cause said chroma signal to be demodulated at an angle which lags said reference signal by substantially 10°, 25° or 40°, said amplitude decreasing means being operable to decrease the amplitude of the chroma signal applied to said second demodulator means in the ratios of 1, 0.75 or 0.50 respectively.

* * * * *